(12) United States Patent
Hasegawa et al.

(10) Patent No.: US 11,340,491 B2
(45) Date of Patent: May 24, 2022

(54) ELECTRONIC EQUIPMENT

(71) Applicant: Japan Display Inc., Tokyo (JP)

(72) Inventors: Makoto Hasegawa, Tokyo (JP);
Hiroyuki Shimokawa, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 17/314,437

(22) Filed: May 7, 2021

(65) Prior Publication Data

US 2021/0263375 A1  Aug. 26, 2021

Related U.S. Application Data

(63) Continuation of application No. PCT/JP2019/039856, filed on Oct. 9, 2019.

(30) Foreign Application Priority Data

Nov. 9, 2018  (JP) .............................. JP2018-211572

(51) Int. Cl.
*G02F 1/1335* (2006.01)
*G02F 1/1333* (2006.01)
*G02F 1/13357* (2006.01)

(52) U.S. Cl.
CPC ...... *G02F 1/133524* (2013.01); *G02F 1/1336* (2013.01); *G02F 1/13338* (2013.01); *G02F 1/133512* (2013.01)

(58) Field of Classification Search
None
See application file for complete search history.

(56) References Cited

U.S. PATENT DOCUMENTS

| 10,768,356 | B1* | 9/2020 | Zhang ................. G02B 6/0035 |
| 2006/0028597 | A1* | 2/2006 | Kitagawa .......... G02F 1/133615 |
| | | | 349/64 |
| 2017/0053592 | A1 | 2/2017 | Shin et al. |
| 2020/0117034 | A1* | 4/2020 | Yin ....................... H04N 7/142 |
| 2020/0244787 | A1* | 7/2020 | Gu ...................... H04M 1/0264 |

FOREIGN PATENT DOCUMENTS

| CN | 107784989 A | * | 3/2018 |
| JP | 2008191261 A | * | 8/2008 |
| JP | 2017-040908 A | | 2/2017 |

(Continued)

OTHER PUBLICATIONS

English translation of KR-20100121249-A, Title: Lighting Device, Author: Park Sang Hyun; Date of publication: Nov. 17, 2010 (Year: 2010).*

(Continued)

*Primary Examiner* — Shan Liu
(74) *Attorney, Agent, or Firm* — Oblon, McClelland, Maier & Neustadt, L.L.P.

(57) ABSTRACT

According to one embodiment, an electronic equipment includes a liquid crystal panel, and an illumination device illuminating the liquid crystal panel. The illumination device includes a first light guide including a first opening composed of a notch or a through hole and opposed to the liquid crystal panel, a first light source opposed to the first light guide, a second light guide provided in the first opening and opposed to the liquid crystal panel, and a second light source opposed to the second light guide.

2 Claims, 10 Drawing Sheets

(56) References Cited

FOREIGN PATENT DOCUMENTS

KR          20100121249 A    * 11/2010
WO     WO-2020202924 A1   * 10/2020   ............... G09G 3/20

OTHER PUBLICATIONS

English translation of CN-107784989-A, Title: A Liquid Crystal Display Device With Camera Module, Author: Huang, Zhang-fa; Lu, Hao; Wu, Guan-si; Zhang, De-wen; Date of publication: Mar. 9, 2018 (Year: 2018).*
English translation of JP-2008191261-A, Title: Liquid Crystal Display Device, Author: Numao Koji; Date of publication: Aug. 21, 2008 (Year: 2008).*
English translation of WO 2020202924 A1, Title: Electronic Apparatus, Author: Shimokawa, Hiroyuki; Suzuki, Nobuyuki; Date of publication: Oct. 8, 2020 (Year: 2020).*

* cited by examiner

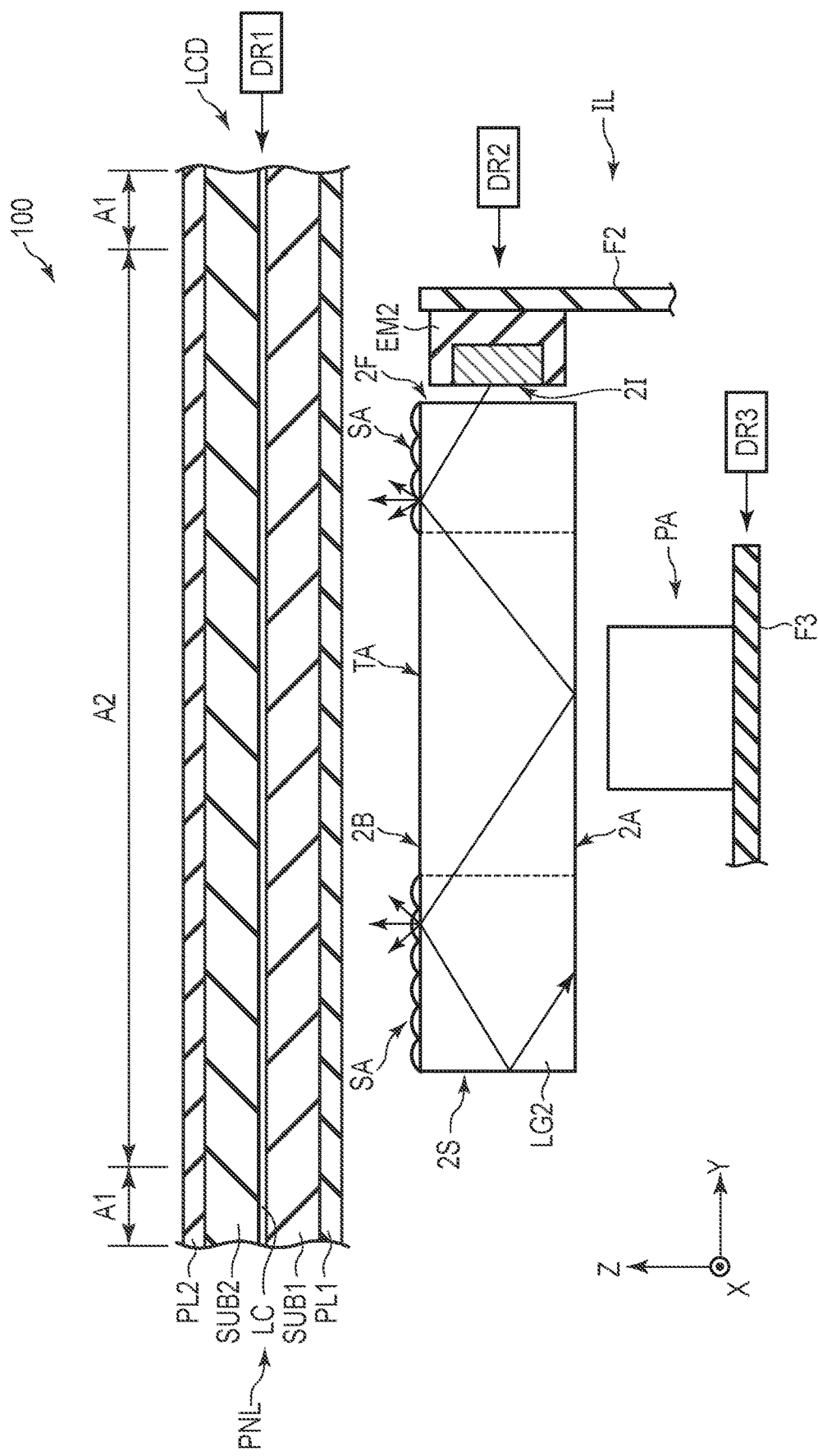
F I G. 7

US 11,340,491 B2

ELECTRONIC EQUIPMENT

CROSS-REFERENCE TO RELATED APPLICATIONS

This application is a Continuation Application of PCT Application No. PCT/JP2019/039856, filed Oct. 9, 2019 and based upon and claiming the benefit of priority from Japanese Patent Application No. 2018-211572, filed Nov. 9, 2018, the entire contents of all of which are incorporated herein by reference.

FIELD

Embodiments described herein relate generally to an electronic equipment.

BACKGROUND

Recently, electronic equipments such as a smartphone comprising a display portion and a camera on the same surface side have been widely put into practical use. In such an electronic equipment, the camera is provided outside the display portion. Demands to reduce an outer frame width of the display portion while maintaining a space to install the camera have been increased.

In addition, capturing sharp pictures is desired.

BRIEF DESCRIPTION OF THE DRAWINGS

FIG. 7 is a cross-sectional view showing parts of the electronic equipment 100 of the embodiment, illustrating a driving method of the electronic equipment 100.

DETAILED DESCRIPTION

Figure 1:
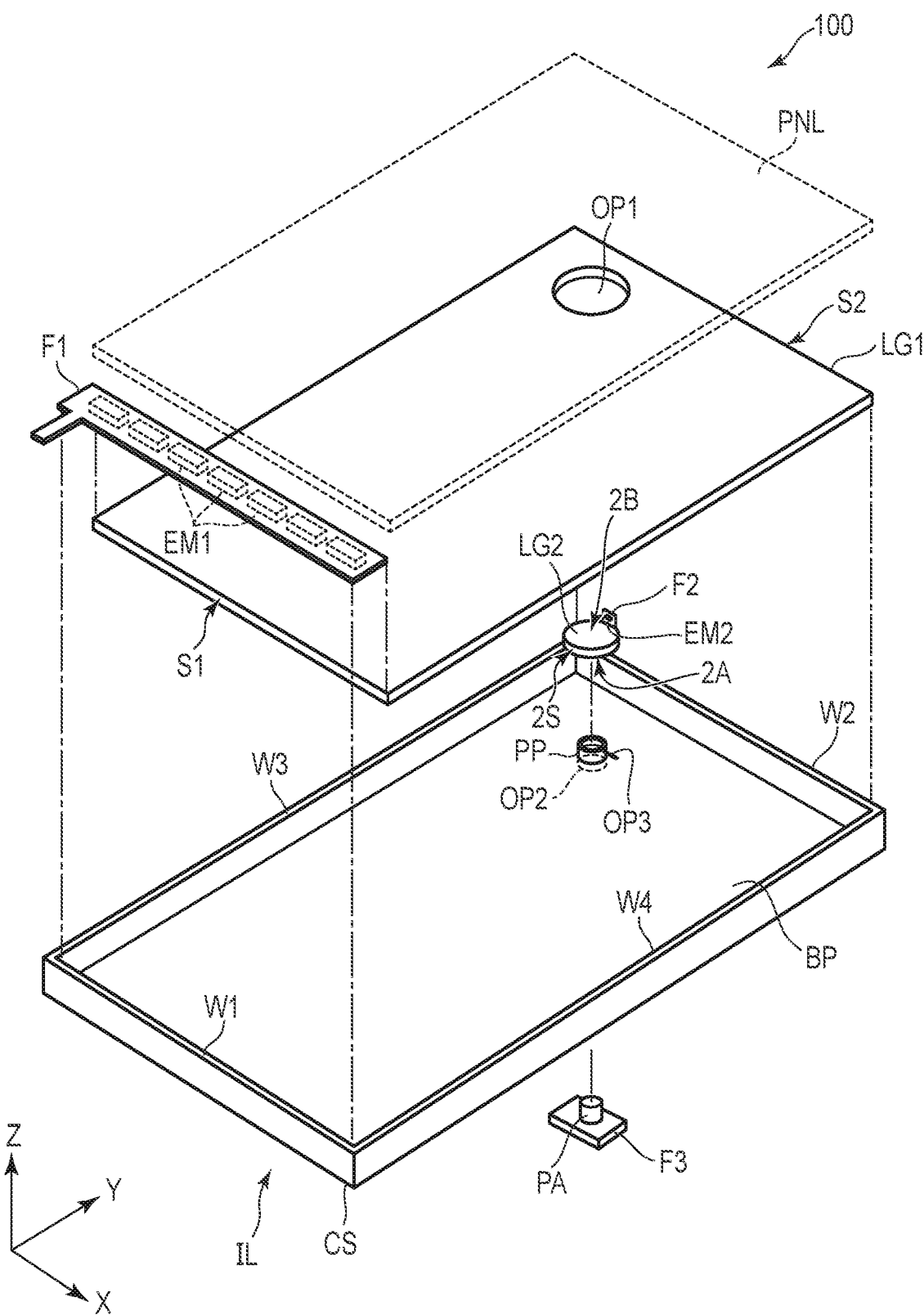
FIG. 1 is an exploded perspective view showing a configuration example of an electronic equipment 100 comprising an illumination device IL of an embodiment.

In general, according to one embodiment, there is provided an electronic equipment comprising a liquid crystal panel, and an illumination device illuminating the liquid crystal panel. The illumination device includes a first light guide including a first opening composed of a notch or a through hole and opposed to the liquid crystal panel, a first light source opposed to the first light guide, a second light guide provided in the first opening and opposed to the liquid crystal panel, and a second light source opposed to the second light guide.

An embodiment and modified examples will be described hereinafter with reference to accompanying drawings. The disclosure is merely an example, and proper changes in keeping with the spirit of the invention, which are easily conceivable by a person of ordinary skill in the art, come within the scope of the invention as a matter of course. In addition, in some cases, in order to make the description clearer, the widths, thicknesses, shapes and the like, of the respective parts are illustrated schematically in the drawings, rather than as an accurate representation of what is implemented. However, such schematic illustration is merely exemplary, and in no way restricts the interpretation of the invention. In addition, in the specification and drawings, structural elements which function in the same or a similar manner to those described in connection with preceding drawings are denoted by like reference numbers, detailed description thereof being omitted unless necessary.

EMBODIMENT

First, an embodiment will be described. FIG. 1 is an exploded perspective view showing a configuration example of an electronic equipment 100 comprising an illumination device IL of the embodiment.

As shown in FIG. 1, a first direction X, a second direction Y, and a third direction Z are orthogonal to each other but may intersect at an angle other than 90 degrees.

The illumination device IL comprises light guides LG1 and LG2, light sources EM1 and EM2, and a casing CS. The illumination device IL illuminates, for example, a liquid crystal panel PNL simply represented by a dashed line in FIG. 1.

The light guide LG1 is formed in a flat panel shape parallel to an X-Y plane defined by the first direction X and the second direction Y. The light guide LG1 is opposed to the liquid crystal panel PNL in the third direction Z. The light guide LG1 has a side surface S1, a side surface S2 on a side opposite to the side surface S1, and an opening OP1. Each of the side surfaces S1 and S2 extends in the first direction X. For example, the side surfaces S1 and S2 are surfaces parallel to an X-Z plane defined by the first direction X and the third direction Z. The opening OP1 is a through hole which penetrates the light guide LG1 in the third direction Z. The opening OP1 is located between the side surfaces S1 and S2 and is closer to the side surface S2 than to the side surface S1, in the second direction Y.

A plurality of light sources EM1 are arranged in the first direction X and spaced part at intervals. Each of the light sources EM1 is mounted on a wiring substrate F1 and is electrically connected to the wiring substrate F1.

The light guide LG2 has a main surface 2A, a main surface 2B on a side opposite to the main surface 2A, and a side surface 2S located between the main surface 2A and the main surface 2B. The main surfaces 2A and 2B are the surfaces parallel to the X-Y plane. The main surface 2B is opposed to the liquid crystal panel PNL. The light guide LG2 is overlaid on the opening OP1 in the third direction Z. A light source EM2 is mounted on a wiring substrate F2 and is electrically connected to the wiring substrate F2. In the example illustrated, one light source EM2 is mounted but a plurality of light sources EM2 may be arranged and spaced apart at intervals. The light sources EM1 and EM2 are, for example, light-emitting diodes (LEDs).

The casing CS accommodates the light guides LG1 and LG2, and the light sources EM1 and EM2. The casing CS has side walls W1 to W4, a bottom plate BP, openings OP2 and OP3, and a protruding portion PP. The side walls W1 and W2 extend in the first direction X and are opposed to each other. The side walls W3 and W4 extend in the second direction Y and are opposed to each other. The openings OP2 and OP3 are through holes which penetrate the bottom plate BP in the third direction Z. The openings OP2 and OP3 are overlaid on the opening OP1 in the third direction Z. The opening OP3 is, for example, a through hole through which the wiring substrate F2 is passed. The protruding portion PP is provided to protrude from the bottom plate BP toward the liquid crystal panel PNL in the third direction Z and surround the opening OP2.

The electronic equipment 100 incorporating such an illumination device IL comprises a photoreceiver PA. The photoreceiver PA is provided to be overlaid on the opening OP2 in the third direction Z. The photoreceiver PA is mounted on a wiring substrate F3 and is electrically connected to the wiring substrate F3. Incidentally, the photoreceiver PA may be electrically connected to the wiring substrate F2 common to the light source EM2.

The liquid crystal panel PNL is overlaid on the light guide LG1 and is also overlaid on the light guide LG2, the light source EM2, the wiring substrate F2, and the photoreceiver PA at the opening OP1.

Figure 2:
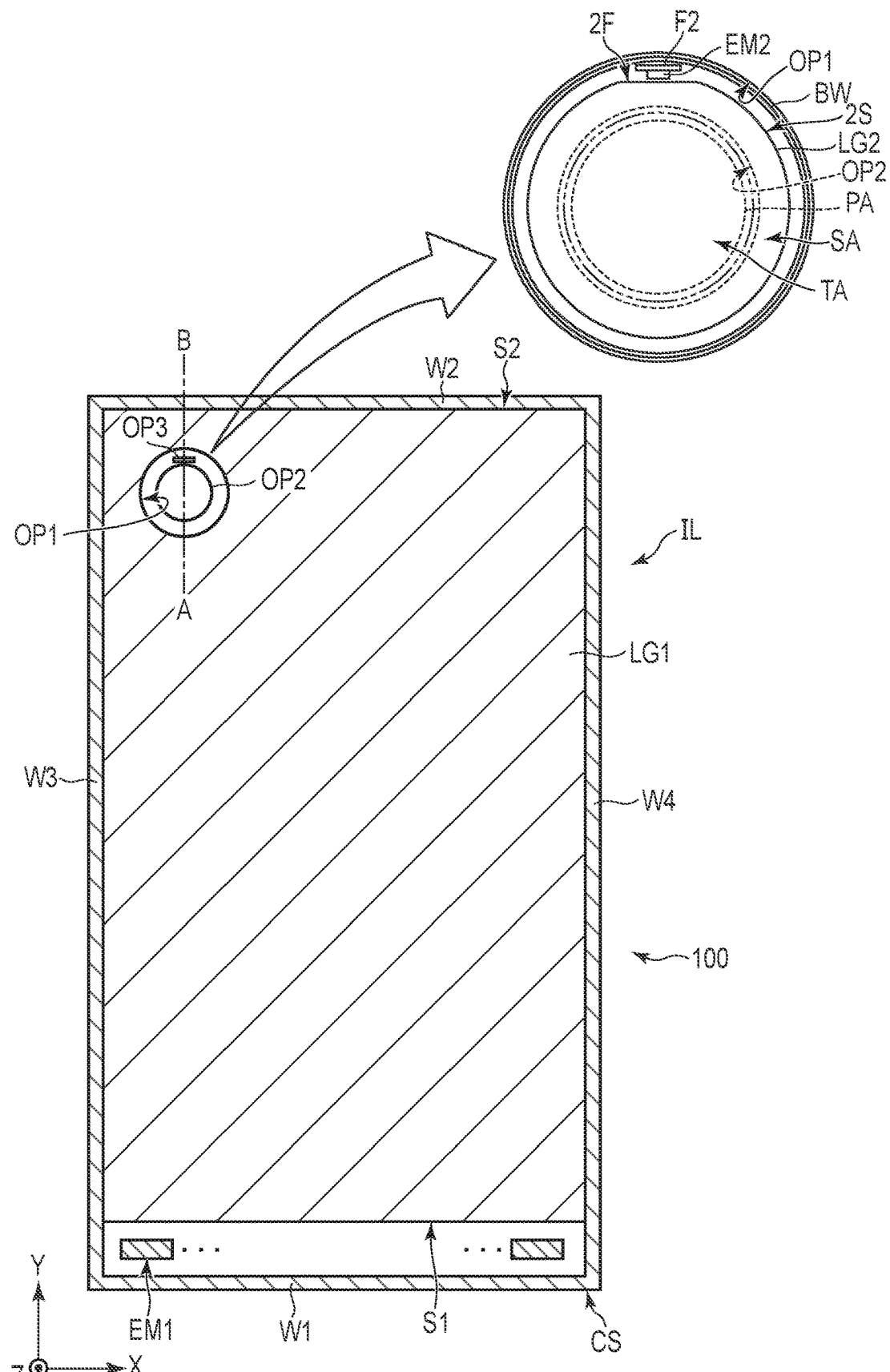
FIG. 2 is a plan view showing the electronic equipment 100 shown in FIG. 1.

FIG. 2 is a plan view showing the electronic equipment 100 shown in FIG. 1.

As shown in FIG. 2, the light sources EM1 are arranged between the side surface S1 of the light guide LG1 and the side wall W1 of the casing CS and are opposed to the side surface S1. Incidentally, illustration of the wiring substrate F1 shown in FIG. 1 is omitted. The illumination light emitted from the light source EM1 is made incident on the light guide LG1 from the side surface S1 and travels inside the light guide LG1 from the side surface S1 to the side surface S2 in the second direction Y.

The openings OP2 and OP3 of the casing CS are located inside the opening OP1 of the light guide LG1. In the example illustrated, each of the openings OP1 and OP2 has a circular shape in planar view, but may have the other shape such as an ovally rounded rectangle or a polygon. As shown in an enlarged manner in FIG. 2, the light source EM2, the wiring substrate F2, and the light guide LG2 are located inside the opening OP1. The photoreceiver PA is located inside the openings OP1 and OP2. The illumination device IL further comprises a light-shielding wall BW. The light-shielding wall BW is located inside the opening OP1 and surrounds the side surface 2S of the light guide LG2. That is, the light-shielding wall BW is located between the light guide LG1 and the light guide LG2. The light source EM2, the wiring substrate F2, and the light guide LG2 are located inside the light-shielding wall BW. The light source EM2 faces the side surface 2S of the light guide LG2. The side surface 2S has a substantially circular shape in planar view. In the example illustrated, the side surface 2S has a light incident surface 2F that faces the light source EM2. The light incident surface 2F is, for example, a surface parallel to the X-Z plane defined by the first direction X and the third direction Z. The light guide LG2 includes a transmissive area TA and a diffusion area SA surrounding the transmissive area TA. The transmissive area TA is overlaid on the photoreceiver PA, and the diffusion area SA is not overlaid on the photoreceiver PA.

Figure 3:
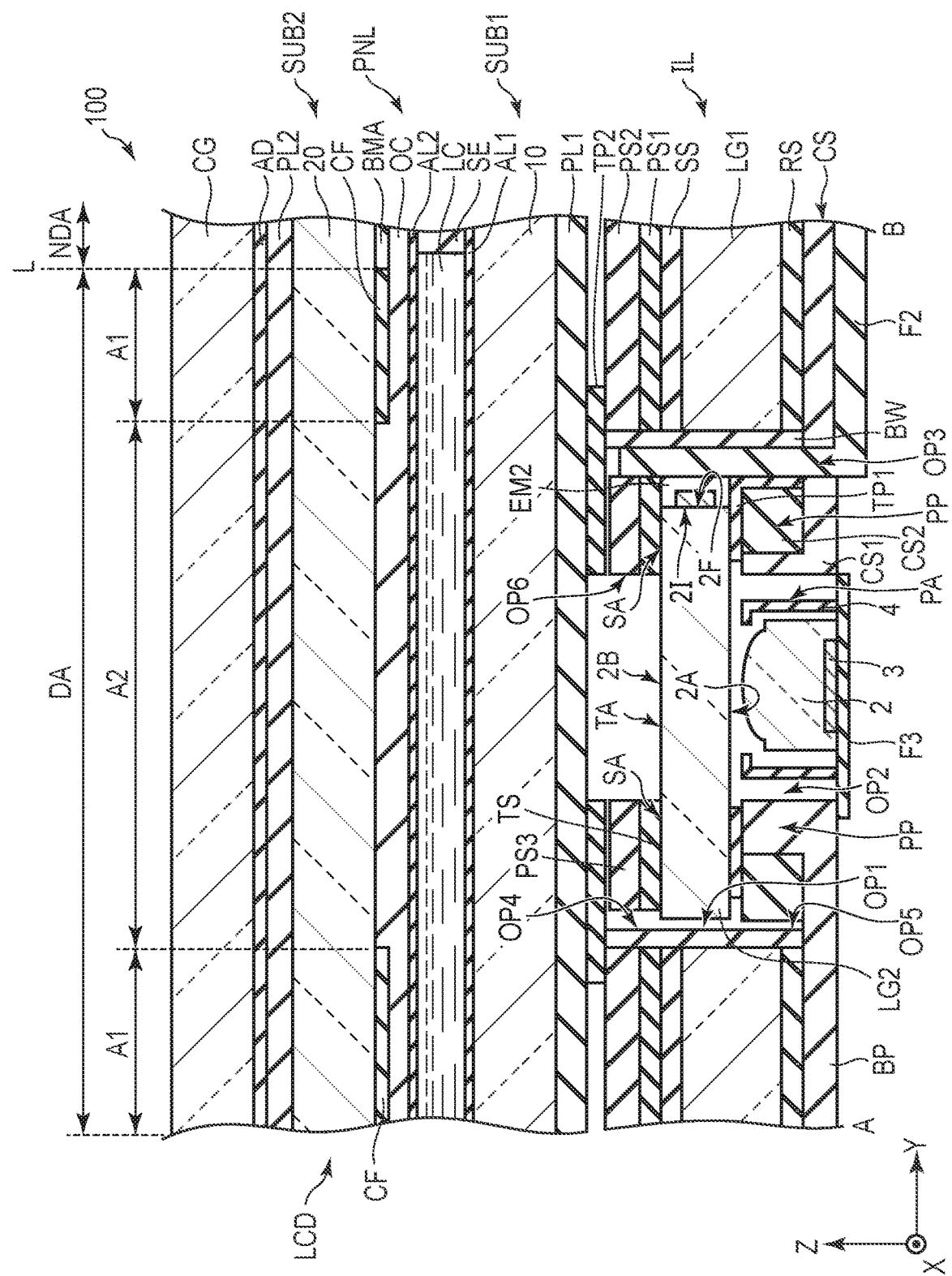
FIG. 3 is a cross-sectional view showing the electronic equipment 100 taken along line A-B shown in FIG. 2.

FIG. 3 is a cross-sectional view showing the electronic equipment 100 taken along line A-B shown in FIG. 2. A cross section of the electronic equipment 100 including the liquid crystal panel PNL, the photoreceiver PA, and the illumination device IL in the second direction Y is shown.

As shown in FIG. 3, the illumination device IL further comprises a reflective sheet RS, a diffusion sheet SS, prism sheets PS1 to PS3, a wavelength conversion element TS, and an adhesive tape TP1.

The reflective sheet RS, the light guide LG1, the diffusion sheet SS, the prism sheet PS1, and the prism sheet PS2 are arranged in this order in the third direction Z and accommodated in the casing CS. The casing CS comprises a metallic casing CS1, and a pedestal CS2 formed of resin. The pedestal CS2 and the casing CS1 form the protruding portion PP. Each of the diffusion sheet SS, the prism sheet PS1, and the prism sheet PS2 includes an opening OP4 overlaid on the opening OP1. The reflective sheet RS includes an opening OP5 overlaid on the opening OP1. The protruding portion PP of the casing CS is located inside the opening OP1, the opening OP4, and the opening OP5.

The light guide LG2 is located between the liquid crystal panel PNL and the photoreceiver PA. The adhesive tape TP1 is located between the main surface 2A of the light guide LG2 and the protruding portion PP, and between the wiring substrate F2 and the protruding portion PP. In the example illustrated, the adhesive tape TP1 fixes the light guide LG2 to the upper surface of the protruding portion PP, and bonds the wiring substrate F2 and the side surface of the protruding portion PP. In addition, since the light guide LG2 is overlaid on the photoreceiver PA, entry of a foreign matter between the light guide LG2 and the photoreceiver PA is suppressed.

The wavelength conversion element TS is located between the light guide LG2 and the liquid crystal panel PNL. The wavelength conversion element TS faces the main surface 2B of the light guide LG2 in the diffusion area SA. The prism sheet PS3 is located between the wavelength conversion element TS and the liquid crystal panel PNL. The prism sheet PS3 is located on the wavelength conversion element TS. Each of the wavelength conversion element TS and the prism sheet PS3 is formed in an annular shape and has an opening OP6 overlaid on the opening OP2. The wavelength conversion element TS absorbs light and emits light having a wavelength longer than the wavelength of the absorbed light. The wavelength conversion element TS includes, for example, quantum dots as the light emitting material. However, the material is not limited to this, and may contain a material that emits fluorescence or phosphorescence. Incidentally, when the light source EM2 emits white light, the wavelength conversion element TS may not be provided.

The prism sheet PS3 improves, for example, the brightness of the light emitted from the wavelength conversion element TS. The light source EM2 has a light emitting surface 21 opposed to the light incident surface 2F. In the example illustrated, the light incident surface 2F and the light emitting surface 21 are in contact with each other, but may be separated from each other. The wiring substrate F2 is located between the light source EM2 and the light-shielding wall BW. The wiring substrate F2 extends to the lower surface side of the casing CS through the opening OP3. The light-shielding wall BW is located between the wiring substrate F2 and the light guide LG1 and between the light guide LG1 and the light guide LG2. Thus, the space between the light guide LG1 and the light guide LG2 is shielded by the light-shielding wall BW. In the example illustrated, the light-shielding wall BW is in contact with each of the reflective sheet RS, the light guide LG1, the diffusion sheet SS, and the prism sheets PS1 and PS2, but may not be in contact therewith. The light-shielding wall BW is formed of, for example, a resin material colored in black.

A polarizer PL1, the liquid crystal panel PNL, a polarizer PL2, and a cover glass CG are arranged in this order in the third direction Z, and configures a liquid crystal element LCD comprising an optical switch function for light traveling in the third direction Z. An adhesive tape TP2 is, for example, a transparent or white double-sided adhesive tape, and bonds the illumination device IL and the liquid crystal element LCD. In this embodiment, the adhesive tape TP2 bonds the polarizer PL1 and the prism sheet PS2. The tape TP2 is not bonded to the prism sheet PS3.

The liquid crystal panel PNL may have a configuration corresponding to any one of a display mode using a lateral electric field along the main surface of the substrate, a display mode using a longitudinal electric field along the normal of the main surface of the substrate, a display mode using an inclined electric field which is tilted obliquely with respect to the main surface of the substrate, and a display mode using an appropriate combination of the above lateral electric field, longitudinal electric field, and inclined electric field. The main surface of the substrate here is a surface parallel to the X-Y plane.

The liquid crystal panel PNL comprises a display portion DA which displays an image and a non-display portion NDA surrounding the display portion DA. The liquid crystal panel PNL comprises a first substrate SUB1, a second substrate SUB2, a liquid crystal layer LC, and a sealant SE. The sealant SE is located in the non-display portion NDA to bond the first substrate SUB1 and the second substrate SUB2 and to seal the liquid crystal layer LC.

Main parts of the first substrate SUB1 and the second substrate SUB2 will be described below. The first substrate SUB1 comprises an insulating substrate 10 and an alignment film AL1. The second substrate SUB2 comprises an insulating substrate 20, a color filter CF, a light-shielding layer BMA, a transparent layer OC, and an alignment film AL2.

The insulating substrates 10 and 20 are transparent substrates such as glass substrates or flexible resin substrates. The alignment films AL1 and AL2 are in contact with the liquid crystal layer LC.

The color filter CF, the light-shielding layer BMA, and the transparent layer OC are located between the insulating substrate 20 and the liquid crystal layer LC. Incidentally, in the example illustrated, the color filter CF is provided on the second substrate SUB2, but may be provided on the first substrate SUB1.

The light-shielding layer BMA is located at the non-display portion NDA. A boundary L between the display portion DA and the non-display portion NDA is defined by, for example, an inner end of the light-shielding layer BMA (the end part on the display portion DA side). The sealant SE is located at a position overlaid on the light-shielding layer BMA.

Details of the color filter CF are omitted here, but the color filter CF comprises, for example, a red colored filter arranged in a red pixel, a green colored filter arranged in a green pixel, and a blue colored filter arranged in a blue pixel. In addition, the color filter CF often comprises a transparent resin layer arranged at a white pixel. The transparent layer OC covers the color filter CF and the light-shielding layer BMA. For example, the transparent layer OC is a transparent organic insulating layer.

The display portion DA includes an area A1 where the color filter CF is arranged and an area A2 where the color filter CF is not arranged. The transparent layer OC is arranged over the areas A1 and A2, is in contact with the color filter CF in the area A1, and is in contact with the insulating substrate 20 in the area A2. The alignment films AL1 and AL2 are provided over the areas A1 and A2.

In the present embodiment, the photoreceiver PA is, for example, a camera. Incidentally, the photoreceiver PA may be, for example, an element that detects visible light, an element that detects infrared rays, a proximity sensor that senses the proximity of a detection target, a detection element that detects infrared rays reflected from the detection target, and the like, or a combination thereof. The electronic equipment 100 may comprise a light emitting element instead of the photoreceiver PA or in addition to the photoreceiver PA. Examples of the light emitting element include a projection element that projects infrared rays toward a detection target.

The photoreceiver PA is provided so as to be overlaid on the opening OP2 of the casing CS and is located on the inner side surrounded by the protruding portion PP. The photoreceiver PA is overlaid on the cover glass CG, the polarizer PL2, the liquid crystal panel PNL, the polarizer PL1, and the light guide LG2 in the third direction Z. Incidentally, a part or all parts of the photoreceiver PA are overlaid on the display portion DA of the liquid crystal panel PNL in the third direction Z. That is, in the electronic equipment 100 including the liquid crystal panel PNL and the photoreceiver PA, the photoreceiver PA may be provided on the back side of the liquid crystal panel PNL when viewed from the user of the electronic equipment 100.

When the positional relationship between the illustrated photoreceiver PA and the display portion DA is focused, the photoreceiver PA is overlaid on the area A2. That is, the color filter CF is not overlaid on the photoreceiver PA.

For example, the photoreceiver PA comprises an optical system 2 including at least one lens, an image sensor (imaging device) 3, and a casing 4. The casing 4 accommodates the optical system 2 and the image sensor 3. The optical system 2 is located between the liquid crystal panel PNL and the image sensor 3. The image sensor 3 receives light via the cover glass CG, the polarizer PL2, the liquid crystal panel PNL, the polarizer PL1, and the light guide LG2. For example, the photoreceiver PA receives visible light (for example, light in the range of 400 nm to 700 nm) transmitted through the cover glass CG, the polarizer PL2, the display portion DA, the polarizer PL1, and the light guide LG2. When the absorption axis of the polarizer PL1 and the absorption axis of the polarizer PL2 are orthogonal to each other, and the retardation of the liquid crystal layer LC is substantially zero or $\lambda$ where $\lambda$ is the wavelength of light transmitted through the liquid crystal layer LC of the liquid crystal element LCD, the transmittance of the liquid crystal element LCD becomes minimum. For this reason, the retardation of the liquid crystal layer LC is set to be larger than zero and smaller than $\lambda$ when capturing an image with the photoreceiver PA. When the retardation is approximately $\lambda/2$, the transmittance of the liquid crystal element LCD becomes maximum.

The polarizer PL1 is bonded to the insulating substrate 10. The polarizer PL2 is bonded to the insulating substrate 20. The polarizer PL2 is bonded to the cover glass CG by the transparent adhesive layer AD. The polarizers PL1 and PL2 are arranged over the areas A1 and A2. Incidentally, the polarizers PL1 and PL2 may comprise a retardation film, a scattering layer, an anti-reflective layer, and the like as needed.

In addition, a transparent conductive film may be provided between the polarizer PL2 and the insulating substrate 20 in order to prevent the liquid crystal layer LC from being affected by an external electric field or the like. The transparent conductive film is formed of a transparent oxide conductor such as indium-tin-oxide (ITO) or indium-zinc-oxide (IZO). When a sensor is used for the photoreceiver PA and the transparent conductive film causes a decrease in infrared transmittance, reduction in the transmittance of visible light can be suppressed by providing an unformed area of the transparent conductive film in the area A2 overlaid on the sensor. The unformed area of the transparent conductive film can also be made wider than the area A2. A transparent conductive film may be formed at a portion overlaid on the photoreceiver PA for visible light where the infrared transmittance does not matter. When a conductive resin having a higher infrared transmittance than the oxide conductor is used as the transparent conductive film, the transparent conductive film can be provided in a region overlaid on the photoreceiver PA.

In addition, the polarizer PL1 or PL2 can also be provided with an ultra-birefringent film. It is known that the ultra-birefringent film depolarizes the transmitted light (forms natural light) when linearly polarized light is made incident. Even if the subject includes a material that emits polarized light, capturing can be executed without uncomfortable feeling. For example, when the electronic equipment 100 or the like is reflected on the subject of the photoreceiver PA, linearly polarized light is emitted from the electronic equipment 100. Therefore, the brightness of the electronic equipment 100 of the subject made incident on the photoreceiver PA may change depending on the relationship in angle between the polarizers PL1 and PL2 and the polarizer of the electronic equipment 100 that is the subject, and a feeling of discomfort may be caused during capturing. However, a change in brightness that causes a feeling of discomfort can be suppressed by providing the polarizers PL1 and PL2 with the super-birefringent film.

As a film exhibiting the ultra-birefringence, for example, COSMOSHINE (registered trademark) manufactured by TOYOBO CO., LTD., is desirably used. The ultra-birefringence means that the retardation in the in-plane direction with respect to light in the visible region, for example, 500 nm is 800 nm or more.

In the illumination device IL, the reflective sheet RS, the light guide LG1, the diffusion sheet SS, the prism sheets PS1 and PS2, the light source EM1, and the wiring substrate F1 configure a main illumination unit. In contrast, in the illumination device IL, the light guide LG2, the wavelength conversion element TS, the prism sheet PS3, the light source EM2, and the wiring substrate F2 configure a sub-illumination unit.

Figure 4:
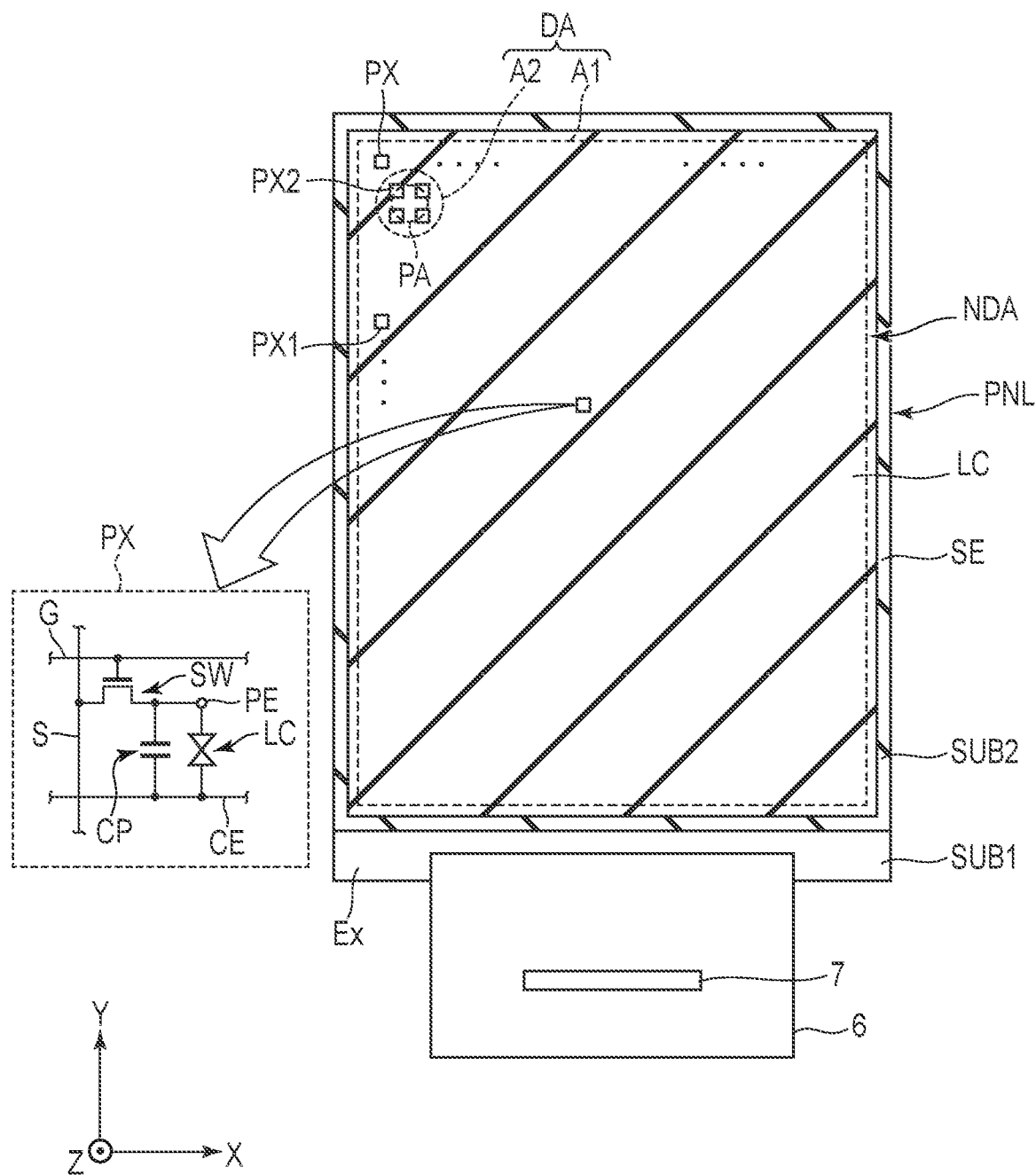
FIG. 4 is a plan view showing a configuration example of the liquid crystal panel PNL shown in FIG. 3.

FIG. 4 is a plan view showing a configuration example of the liquid crystal panel PNL shown in FIG. 3. In FIG. 4, the liquid crystal layer LC and the sealant SE are represented by different hatch lines. The outline of the photoreceiver PA is represented by a dashed line.

As shown in FIG. 4, the display portion DA is an area having a substantially quadrangular shape which does not include a notch, but the four corners may have roundness, the shape may be a polygon or a circle other than the quadrangle. The display portion DA is located on the inner side surrounded by the sealant SE.

The liquid crystal panel PNL comprises pixels PX arrayed in a matrix in the first direction X and the second direction Y, in the display portion DA. Each of the pixels PX in the display portion DA has the same circuit configuration. As shown and enlarged in FIG. 4, each pixel PX comprises a switching element SW, a pixel electrode PE, a common electrode CE, a liquid crystal layer LC, and the like. The switching element SW is constituted by, for example, a thin-film transistor (TFT) and is electrically connected to a scanning line G and a signal line S. A control signal to control the switching element SW is supplied to the scanning line G. A video signal is supplied to the signal line S as a signal different from the control signal. The pixel electrode PE is electrically connected to the switching element SW. The liquid crystal layer LC is driven by an electric field produced between the pixel electrode PE and the common electrode CE. For example, a capacitance CP is formed between an electrode having the same potential as the common electrode CE and an electrode having the same potential as the pixel electrode PE.

A wiring substrate 6 is mounted on and electrically connected to an extended portion Ex of the first substrate SUB1. An IC chip 7 is mounted on the wiring substrate 6 and is electrically connected to the wiring substrate 6. Incidentally, the IC chip 7 may be mounted on the extended portion Ex and electrically connected to the extended portion Ex. The IC chip 7 incorporates, for example, a display driver which outputs a signal necessary for image display, and the like. The wiring substrate 6 is a foldable flexible printed circuit.

In the display portion DA, the pixel PX1 which is not overlaid on the photoreceiver PA corresponds to the pixel in the area A1 shown in FIG. 3 and comprises a color filter CF. That is, the pixel PX1 can display any color of red, green, and blue. In addition, when the pixel PX1 is a white pixel, the pixel PX1 can display any of white (or transparent), gray, and black colors. The pixel PX1 is arranged over the entire area overlaid on the light guide LG1, in the display portion DA. In addition, the pixel PX1 may be arranged in an area which is not overlaid on the photoreceiver PA, in the area A2.

In the display region DA, the pixel PX2 overlaid on the photoreceiver PA corresponds to the pixel in the area A2 shown in FIG. 3 and does not comprise the color filter CF. That is, the pixel PX2 is a monochromatic display pixel and can display any of white (or transparent), gray, and black colors. Ideally, the pixel PX2 is overlaid on the optical system 2 including the lens of the photoreceiver PA in a planar view, but may be overlaid on the casing 4 of the photoreceiver PA.

In addition, the photoreceiver PA is overlaid on the liquid crystal panel PNL. More specifically, the photoreceiver PA is overlaid on the display portion DA of the liquid crystal panel PNL. Therefore, the display portion DA can be enlarged. In addition, since a space for installing the photoreceiver PA does not need to be provided in the non-display portion NDA, the frame width of the non-display portion NDA can be reduced.

Figure 5:
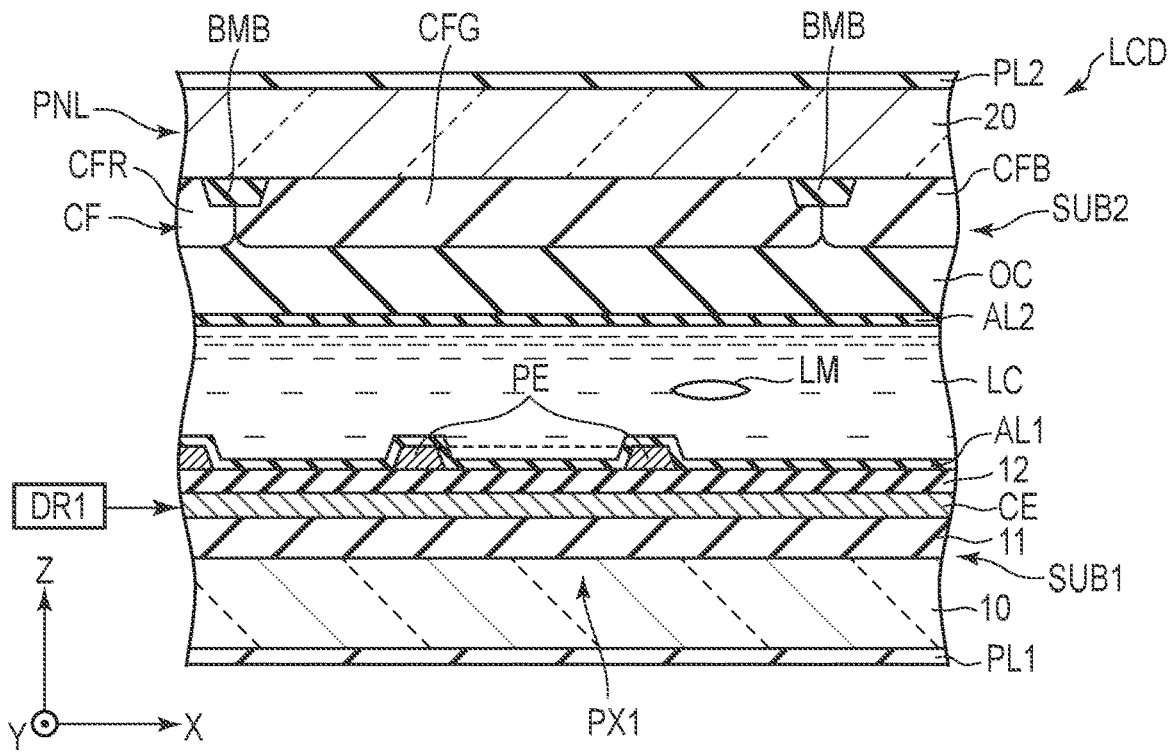
FIG. 5 is a cross-sectional view showing a liquid crystal element LCD including the pixel PX1 shown in FIG. 4.

FIG. 5 is a cross-sectional view showing the liquid crystal element LCD including the pixel PX1 shown in FIG. 4. The liquid crystal element LCD comprising the liquid crystal panel PNL corresponding to the display mode utilizing the lateral electric field between the polarizer PL1 and the polarizer PL2 will be described here.

As shown in FIG. 5, the first substrate SUB1 comprises insulating layers 11 and 12, a common electrode CE, and pixel electrodes PE between the insulating substrate 10 and the alignment film AL1. Incidentally, for example, the scanning line G, the signal line S, and the switching element SW shown in FIG. 4 are located between the insulating substrate 10 and the common electrode CE. The common electrode CE is located on the insulating layer 11 and is covered with the insulating layer 12. The pixel electrodes PE are located on the insulating layer 12 and are covered with the alignment film AL1. Each of the pixel electrodes PE is opposed to the common electrode CE through the insulating layer 12. The common electrode CE and the pixel electrodes PE are formed of a transparent conductive material such as indium-tin-oxide (ITO) or indium-zinc-oxide (IZO). The pixel electrodes PE are linear electrodes, and the common electrode CE is a plate-shaped electrode provided commonly over a plurality of pixels PX1. Incidentally, the pixel electrodes PE may be plate-shaped electrodes and a wire common electrode may be provided between the pixel electrodes PE and the liquid crystal layer LC. The insulating layer 11 is not described in detail, but includes an inorganic insulating layer and an organic insulating layer. The insulating layer 12 is, for example, an inorganic insulating layer of a silicon nitride or the like.

In the second substrate SUB2, a light-shielding layer BMB is formed integrally with the light-shielding layer BMA of the non-display portion NDA shown in FIG. 2. The color filter CF includes a red colored filter CFR, a green colored filter CFG, and a blue colored filter CFB. The green colored filter CFG is opposed to the pixel electrodes PE. The red colored filter CFR and the blue colored filter CFB are also opposed to the other pixel electrodes PE (not shown).

A driver DR1 for driving the liquid crystal element LCD includes, for example, a scanning line driving circuit electrically connected to the scanning line G shown in FIG. 4, and a signal line driving circuit electrically connected to the signal line S. The driver DR1 outputs a signal necessary for image display to each pixel PX of the display portion DA and controls the transmittance of the liquid crystal element LCD. The transmittance of the liquid crystal element LCD is controlled in accordance with the magnitude of the voltage applied to the liquid crystal layer LC.

For example, in the pixel PX1, in an OFF state in which no voltage is applied to the liquid crystal layer LC, liquid crystal molecules LM contained in the liquid crystal layer LC are subjected to initial alignment in a predetermined direction between the alignment films AL1 and AL2. In such an OFF state, the light guided from the light sources EM1 shown in FIG. 1 to the pixel PX1 is absorbed by the polarizers PL1 and PL2. For this reason, the liquid crystal element LCD displays black, in the pixel PX1 in the OFF state.

In contrast, in an ON state in which a voltage is applied to the liquid crystal layer LC, the liquid crystal molecules LM are aligned in a direction different from the initial alignment direction by the electric field formed between the pixel electrodes PE and the common electrode CE, and the alignment direction is controlled by the electric field. In such an ON state, part of the light guided to the pixel PX1 is transmitted through the polarizers PL1 and PL2. For this reason, the liquid crystal element LCD displays the color corresponding to the color filter CF, in the pixel PX1 in the ON state.

The above example corresponds to a so called normally black mode of displaying a black color in the OFF state, but a normally white mode of displaying a black color in the ON state (i.e., displaying a white color in the OFF state) may be applied.

Figure 6:
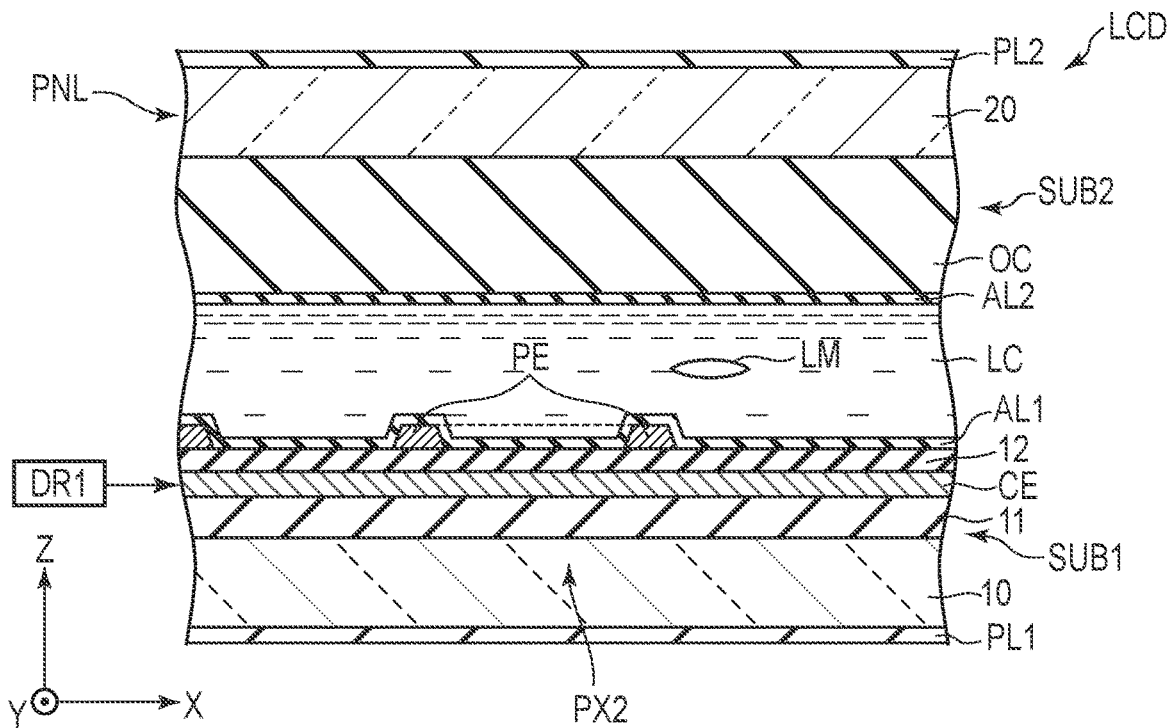
FIG. 6 is a cross-sectional view showing the liquid crystal element LCD including the pixel PX2 shown in FIG. 4.

FIG. 6 is a cross-sectional view showing the liquid crystal element LCD including the pixel PX2 shown in FIG. 4.

As shown in FIG. 6, the pixel PX2 is different from the pixel PX1 shown in FIG. 5 with respect to a feature that the second substrate SUB2 does not comprise the color filter CF or the light-shielding layer BMB. That is, the transparent layer OC is in contact with the insulating substrate 20 immediately above the pixel electrodes PE. Incidentally, a transparent resin layer may be provided between the transparent layer OC and the insulating substrate 20 to adjust the thickness of the transparent layer OC.

The transmittance of the liquid crystal element LCD in the pixel PX2 is controlled by the driver DR1, similarly to the pixel PX1. That is, in the pixel PX2 in the OFF state in which no voltage is applied to the liquid crystal layer LC, the liquid crystal element LCD has the minimum transmittance and displays a black color, similarly to the pixel PX1.

In contrast, in the ON state in which a voltage is applied to the liquid crystal layer LC, part of the light guided to the pixel PX2 is transmitted through the polarizers PL1 and PL2. The liquid crystal element LCD displays a white color or becomes transparent, with the maximum transmittance in the pixel PX2 in the ON state. In addition, as described above, the liquid crystal element LCD may be controlled to have an intermediate transmittance between the minimum transmittance and the maximum transmittance and may display a gray color. Incidentally, the common electrode CE is formed in a flat plate shape in FIG. 6, but the pixel PX2 may be configured such that an opening is provided in the common electrode CE. In addition, when the pixel electrodes PE are provided closer to the insulating substrate 10 than the common electrode CE, openings may be provided in the pixel electrodes PE. Furthermore, the pixel electrodes PE and the common electrode CE may be linear electrodes. In this case, the linear pixel electrodes PE and the linear common electrode CE can be provided in the same layer. In addition, the pixel electrodes PE and the common electrode CE may be provided in different layers through the insulating layer. When a liquid crystal lens is formed with the liquid crystal layer LC, the degree of freedom of the lens characteristics can be increased in the case of forming linear pixel electrodes PE, and a linear common electrode CE and a lens, rather than forming a lens with a flat electrode and a linear electrode.

FIG. 7 is a cross-sectional view showing parts of the electronic equipment 100 of the embodiment, illustrating a driving method of the electronic equipment 100. In FIG. 7, only the main parts of the electronic equipment 100 are illustrated, and the illustration of the wavelength conversion element TS, the prism sheet PS3, and the like is omitted.

As shown in FIG. 7, the light source EM2 is controlled by a driver DR2, and the photoreceiver PA is controlled by a driver DR3.

The main surface 2B of the light guide LG2 is uneven surface in the diffusion area SA. For example, the main surface 2B has a dot pattern in the diffusion area SA. However, the uneven surface may be formed by a pattern other than the dot pattern. The light emitted from the light source EM2 is made incident on the light guide LG2 from the light incident surface 2F and travels in the light guide LG2. Part of the light traveling to the main surface 2B in the diffusion area SA, of the light traveling in the light guide LG2, is diffused so as to travel between the main surface 2B and the liquid crystal element LCD. The light in the transmissive area TA, of the light traveling in the light guide LG2, is reflected on the main surfaces 2A and 2B so as to travel in the light guide LG2.

Next, an example of control by the drivers DR1 to DR3 will be described.

When using the photoreceiver PA, the driver DR1 controls such that at least the area A2 in the liquid crystal element LCD is in a transparent state. Desirably, the retardation of the liquid crystal layer LC is set to approximately λ/2, and the transmittance of the liquid crystal element LCD is controlled to be the maximum.

The driver DR2 controls the light source EM2 to be turned off.

The driver DR3 controls the photoreceiver PA to receive light via the liquid crystal element LCD and the light guide LG2. For example, when the photoreceiver PA is a camera, an image is captured by the camera, and when the photoreceiver PA is a sensor, the sensor performs sensing. By such control, there is no influence of the illumination light from the light source EM2 at the time of capturing using the camera or sensing using the sensor. In addition, since the light-shielding wall BW is provided between the light guides LG1 and LG2, it is possible to suppress the illumination light emitted from the light source EM1, traveling in the light guide LG1 and being made incident on the light guide LG2 when the photoreceiver PA is activated.

When the photoreceiver PA is not used, the illumination light emitted from the light source EM1 shown in FIG. 2 illuminates the area A1 of the liquid crystal panel PNL via the light guide LG1. However, the illumination light emitted from the light source EM1 can hardly illuminate the area A2 via the light guide LG1. The driver DR2 controls the light source EM2 to turn on. Thus, the illumination light emitted from the light source EM2 illuminates the area A2 of the liquid crystal element LCD by the light guide LG2. Therefore, in the illumination device IL, the non-uniformity of the brightness of the illumination light, which results from providing the opening OP1 in the light guide LG1 can be mitigated. Then, the illumination device IL can selectively illuminate the areas A1 and A2. For this reason, the illumination device IL capable of selecting the area for illuminating the liquid crystal panel PNL can be obtained. In addition, the driver DR1 controls the pixel PX2 in the area A2, so that an image can be displayed in the area A2.

In the above configuration example, the light guide LG1 corresponds to the first light guide, the light guide LG2 corresponds to the second light guide, the light source EM1 corresponds to the first light source, the light source EM2 corresponds to the second light source, the main surface 2B corresponds to the first main surface, the main surface 2A corresponds to the second main surface, and the opening OP1 corresponds to the first opening.

According to the electronic equipment 100 according to the embodiment configured as described above, the illumination device IL can selectively illuminate the areas A1 and A2. The liquid crystal panel PNL is not opened in the area A2. The liquid crystal display panel PNL includes the pixels PX in both of the regions A1 and A2. When displaying an image, the illumination device IL can illuminate both of the areas A1 and A2. An image can be displayed in not only the area A1, but the area A2. When the photoreceiver PA is activated, the illumination device IL illuminates the area A1 and does not illuminate the area A2. For this reason, the illumination device IL can be controlled so as not to hinder the function of the photoreceiver PA.

In the region A2, the main surfaces 2A and 2B are flat and parallel to each other. For this reason, the light guide LG2 is configured not to hinder the function of the photoreceiver PA.

The adhesive tape TP2 is not a black light-shielding tape. As the adhesive tape TP2, a transparent or white tape is used according to the luminance level of illumination of the light source EM2. For this reason, the light emitted from the prism sheet PS can be desirably made incident on the area A2.

Modified Example 1 of Embodiment

Figure 8:
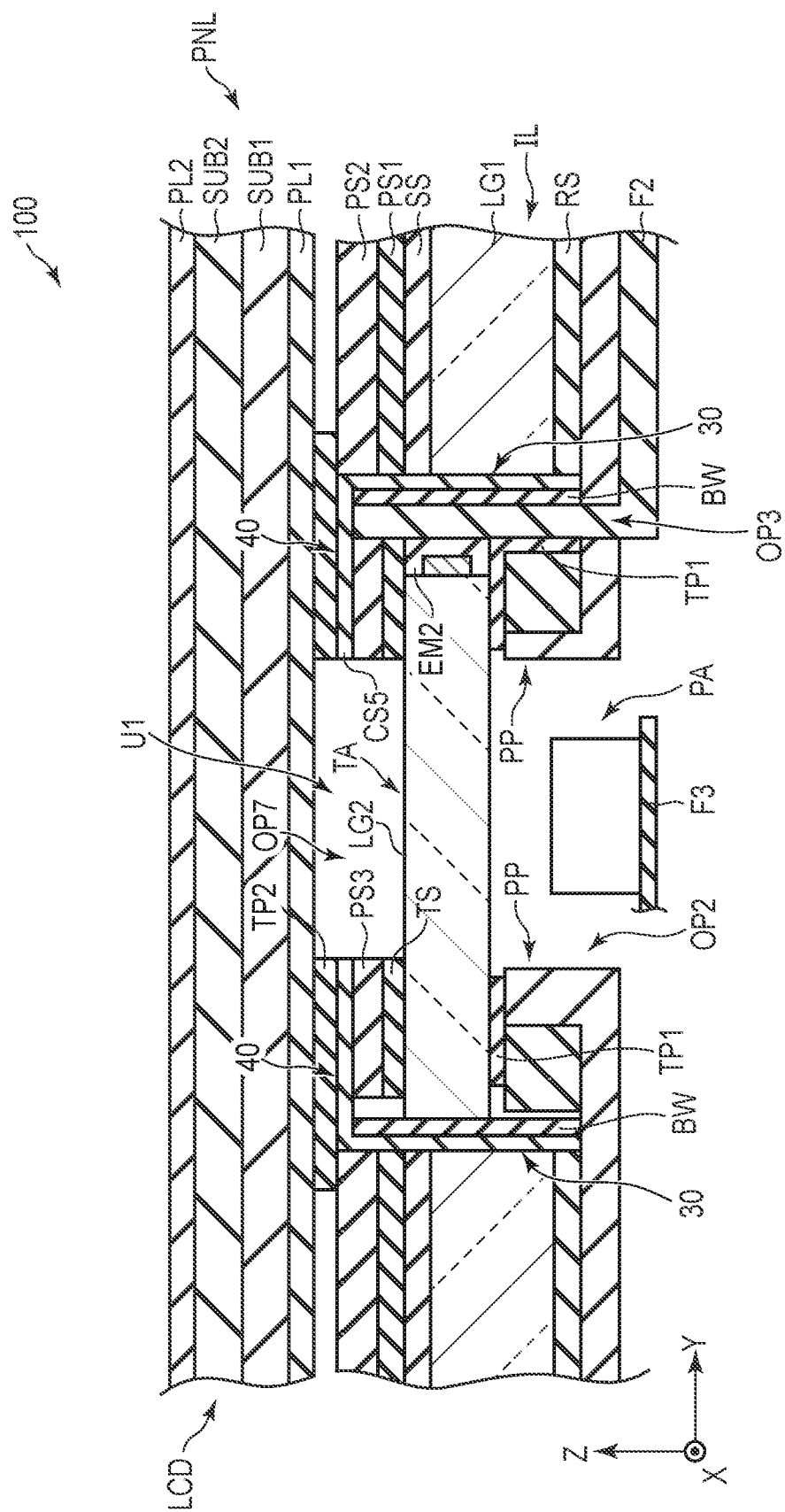
FIG. 8 is a cross-sectional view showing a configuration example of the electronic equipment 100 of modified example 1 of the embodiment.

Next, modified example 1 of the embodiment will be described. FIG. 8 is a cross-sectional view showing a configuration example of the electronic equipment 100 according to modified example 1.

As shown in FIG. 8, the electronic equipment 100 of modified example 1 is different from the configuration example shown in FIG. 3 with respect to a feature that the illumination device IL comprises a casing CS5.

The casing CS5 is formed of, for example, a transparent member. The casing CS5 includes a tubular portion 30 located between the light guide LG1 and the light guide LG2, and a plate portion 40 located between the liquid crystal panel PNL and the light guide LG2. The tubular portion 30 is in contact with each of the reflective sheet RS, the light guide LG1, the diffusion sheet SS, and the prism sheets PS1 and PS2. The tubular portion 30 is located between the light-shielding wall BW and the light guide LG1. The plate portion 40 is connected to an end part of the tubular portion 30 on the liquid crystal panel PNL side, and is formed integrally with the tubular portion 30. The plate portion 40 includes an opening OP7 overlaid on the transmissive area TA. The light guide LG2, the light source EM2, a part of the wiring substrate F2, the light-shielding wall BW, the wavelength conversion element TS, and the prism sheet PS3 are accommodated in the casing CS5 and constitute one unit U1.

In such modified example 1, too, the same advantages as those of the above-described embodiment can be obtained. In addition, the light guide LG2, the light source EM2, the light-shielding wall BW, and the like can be formed in the casing CS5 and can be installed in the opening OP1 of the light guide LG1 as one unit U1. Thus, the manufacturing process can be simplified and the productivity can be improved as compared with the case where the light guide LG2, the light source EM2, the light-shielding wall BW, and the like are formed in the opening OP1.

In the configuration example shown in FIG. 8, the opening OP7 corresponds to the third opening.

Modified Example 2 of Embodiment

Next, a configuration example of modified example 2 of the above embodiment will be described with reference to FIGS. 9 and 10. The electronic equipment 100 of modified example 2 is different from the configuration example of the above-described embodiment with respect to a feature that the light sources EM2 and the wiring substrate F2 are located between the light guide LG2 and the photoreceiver PA. In other words, the light sources EM2 and the wiring substrate F2 are opposed to the main surface 2A of the light guide LG2.

Figure 9:
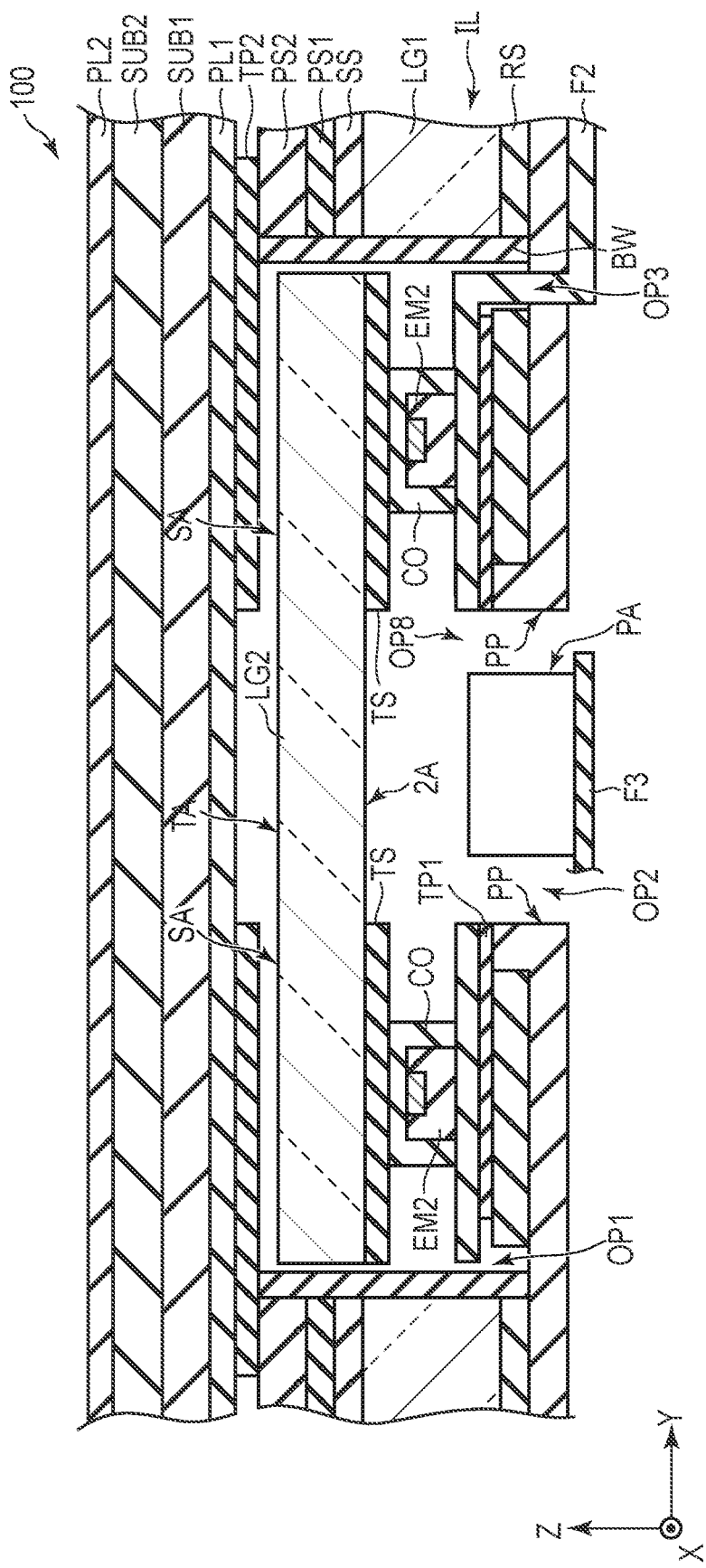
FIG. 9 is a cross-sectional view showing the electronic equipment 100 of modified example 2 of the embodiment.

FIG. 9 is a cross-sectional view showing a configuration example of the electronic equipment 100 according to modified example 2.

As shown in FIG. 9, the illumination device IL further includes a plurality of light sources EM2 and a plurality of cushioning materials CO. The wiring substrate F2 is located between the light guide LG2 and the protruding portion PP. The wiring substrate F2 includes an opening OP8 overlaid on the opening OP2. The plurality of light sources EM2 and the plurality of cushioning materials CO are mounted on the wiring substrate F2. The wavelength conversion element TS is located between the light guide LG2 and the light sources EM2. The wavelength conversion element TS is opposed to the main surface 2A in the diffusion area SA. The wavelength conversion element TS is in contact with the cushioning materials CO and is not in contact with the light sources EM2. The cushioning materials CO are located between the wavelength conversion element TS and the wiring substrate F2. In the third direction Z, the height of the light sources EM2 is lower than the height of the cushioning materials CO. Accordingly, when a shock such as a pressing force is applied to the electronic equipment 100 from the outside, damage of the light sources EM2 caused by the shock such as the pressing force can be suppressed since the cushioning materials CO maintain the interval between the wavelength conversion element TS and the wiring substrate F2.

Figure 10:
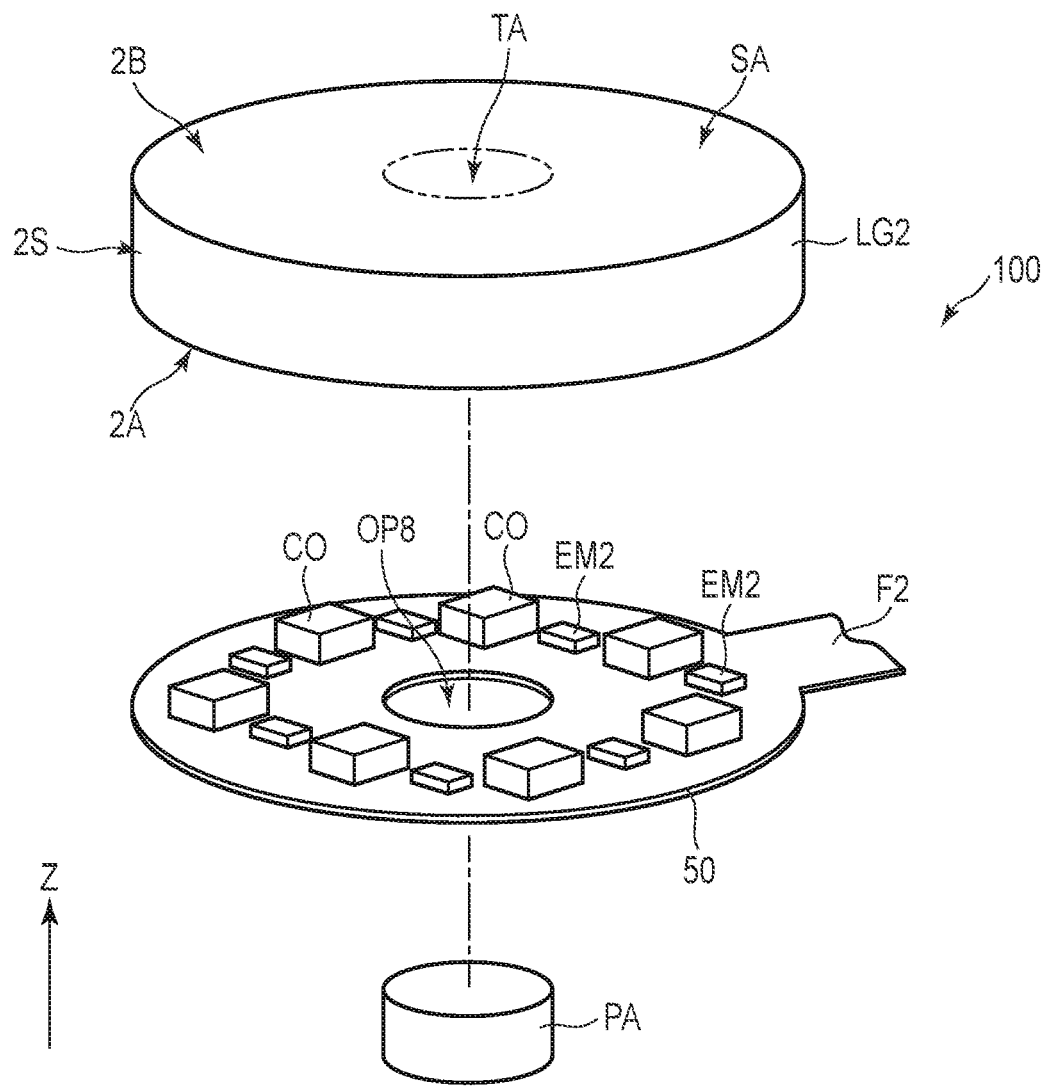
FIG. 10 is an exploded perspective view showing parts of the electronic equipment 100 shown in FIG. 9.

FIG. 10 is an exploded perspective view showing parts of the electronic equipment 100 shown in FIG. 9.

As shown in FIG. 10, the side surface 2S of the light guide LG2 does not have the light incident surface 2F. The wiring substrate F2 has a ring portion 50. The ring portion 50 has an opening OP8 overlaid on the photoreceiver PA. The light sources EM2 and the cushioning materials CO are alternately arranged and spaced apart at intervals on the ring portion 50 around the opening OP8. The plurality of light sources EM2 and the plurality of cushioning materials CO are located between the ring portion 50 of the wiring substrate F2 and the main surface 2A of the light guide LG2.

In the configuration example of modified example 2, too, the same advantages as those of the configuration example of the above-described embodiment can be obtained.

In the configuration example shown in FIGS. 9 and 10, the opening OP8 corresponds to the second opening.

Modified Example 3 of Embodiment

Figure 11:
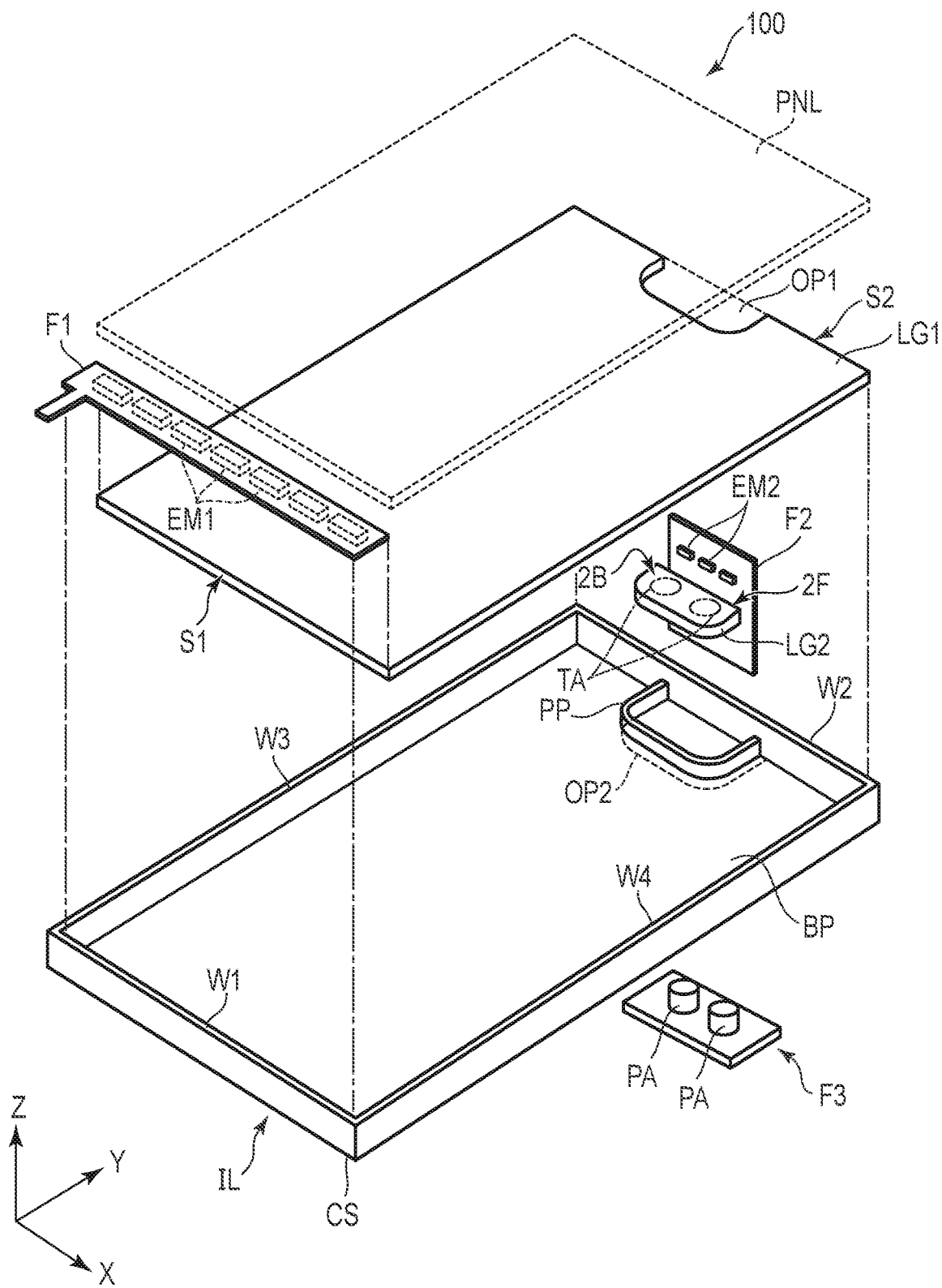
FIG. 11 is an exploded perspective view showing the electronic equipment 100 of modified example 3 of the embodiment.

Next, modified example 3 of the above embodiment will be described. FIG. 11 is an exploded perspective view showing a configuration example of the electronic equipment 100 according to modified example 3.

As shown in FIG. 11, the configuration example of modified example 3 is different from the configuration example of the above-described embodiment with respect to features that the opening OP1 of the light guide LG1 is a recess or notch recessed from the side surface S2 toward the side surface S1 and that a plurality of photoreceivers PA are provided.

In the example illustrated, the illumination device IL comprises a plurality of light sources EM2. The plurality of light sources EM2 are arranged in the first direction X so as to be spaced apart at intervals and are opposed to the light incident surface 2F of the light guide LG2. The light guide LG2 has a transmissive area TA at a position overlaid on each photoreceiver PA, on the main surface 2B.

In the casing CS, the opening OP2 is overlaid on the opening OP1 in the third direction Z. In the example illustrated, the opening OP2 is a through hole that penetrates the bottom plate BP. The protruding portion PP is provided so as to surround the opening OP3 and is connected to the side wall W2. In the third direction Z, the height of the protruding portion PP is lower than the height of the side wall W2.

In modified example 3, too, the same advantages as those of the above-described embodiment can be obtained.

As described above, according to the above-described embodiment and each of the modified examples, the illumination device capable of reducing the unevenness of brightness of the illumination light and the electronic equipment incorporating the illumination device can be provided.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, the uneven surface may not be formed on the main surface 2B, but on the main surface 2A, in the diffusion area SA of the light guide LG2. Alternatively, the uneven surface may be formed on both of the main surfaces 2B and 2A, in the diffusion area SA of the light guide LG2. In addition, the uneven surface may be formed on a surface of the side surface 2S other than the light incident surface 2F.

The above-described embodiment and modified examples are applicable not only to liquid crystal display devices, but also to various electronic equipments.

What is claimed is:

1. An electronic equipment comprising:
  a liquid crystal panel;
  an illumination device illuminating the liquid crystal panel, the illumination device comprising:
    a first light guide including a first opening composed of a notch or a through hole and being opposed to the liquid crystal panel;
    a first light source opposed to the first light guide;
    a second light guide provided in the first opening and opposed to the liquid crystal panel;
    a second light source opposed to the second light guide;
  a photoreceiver overlaid on the liquid crystal panel and receiving light via the liquid crystal panel,
  wherein
  the photoreceiver is provided in the first opening, and
  the second light guide is located between the liquid crystal panel and the photoreceiver;
  the illumination device further comprises a light-shielding; wall located between the first light guide and the second light guide,
  the second light guide includes a first main surface opposed to the liquid crystal panel, a second main surface on an opposite side of the first main surface, and a side surface located between the first main surface and the second main surface, and
  the light-shielding wall surrounds the side surface;
  wherein the second light guide includes a transmissive area and a diffusion area,
  the transmissive area is overlaid on the photoreceiver, and the diffusion area is not overlaid on the photoreceiver;
  the illumination device further comprises a wiring substrate on which the second light source is mounted,
  the second light source is opposed to the side surface, and
  the wiring substrate is located between the second light source and the light-shielding wall, wherein
  the illumination device further comprises a casing located in the first opening,
  the casing includes a tubular portion located between the first light guide and the light-shielding wall, and a plate portion located between the second light guide and the liquid crystal panel, and
  the plate portion includes a third opening overlaid on the transmissive area.

2. An electronic equipment comprising:
  a liquid crystal panel; and an illumination device illuminating the liquid crystal panel, the illumination device comprising:
  a first light guide including a first opening composed of a notch or a through hole and being opposed to the liquid crystal panel;
  a first light source opposed to the first light guide;
  a second light guide provided in the first opening and opposed to the liquid crystal panel;
  a second light source opposed to the second light guide;
a photoreceiver overlaid on the liquid crystal panel and receiving light via the liquid crystal panel,
wherein
the photoreceiver is provided in the first opening, and
the second light guide is located between the liquid crystal panel and the photoreceiver;
the illumination device further comprises a light-shielding wall located between the first light guide and the second light guide,
the second light guide includes a first main surface opposed to the liquid crystal panel, a second main surface on an opposite side of the first main surface, and a side surface located between the first main surface and the second main surface, and
the light-shielding wall surrounds the side surface;
wherein the second light guide includes a transmissive area and a diffusion area,
the transmissive area is overlaid on the photoreceiver, and
the diffusion area is not overlaid on the photoreceiver;
the illumination device further comprises a wiring substrate on which the second light source is mounted,
the second light source is opposed to the side surface, and
the wiring substrate is located between the second light source and the light-shielding wall,
the illumination device further comprises a wavelength conversion element located between the liquid crystal panel and the second light guide, and
the wavelength conversion element is opposed to the first main surface in the diffusion area, wherein
the illumination device further comprises a casing located in the first opening,
the casing includes a tubular portion located between the first light guide and the light-shielding wall, and a plate portion located between the second light guide and the liquid crystal panel, and
the plate portion includes a third opening overlaid on the transmissive area.

* * * * *